United States Patent
Ogawa et al.

(10) Patent No.: US 6,703,139 B1
(45) Date of Patent: Mar. 9, 2004

(54) WEATHER-RESISTANT COMPOSITION, COATING MATERIALS AND MOLDED ARTICLES

(75) Inventors: Takashi Ogawa, Naruto (JP); Koji Mori, Tokushima (JP); Mitsuo Akada, Tokushima (JP)

(73) Assignee: Otsuka Chemical Co., Ltd., Osaka (JP)

( * ) Notice: Subject to any disclaimer, the term of this patent is extended or adjusted under 35 U.S.C. 154(b) by 0 days.

(21) Appl. No.: 09/720,974

(22) PCT Filed: Jul. 8, 1999

(86) PCT No.: PCT/JP99/03715
§ 371 (c)(1),
(2), (4) Date: Jan. 3, 2001

(87) PCT Pub. No.: WO00/02964
PCT Pub. Date: Jan. 20, 2000

(30) Foreign Application Priority Data

Jul. 10, 1998 (JP) .......................................... 10/196099

(51) Int. Cl.[7] .................... B32B 27/00; C08F 126/06; C08F 112/14; C08F 220/10; C08F 216/12
(52) U.S. Cl. .................... 428/500; 526/261; 526/313; 526/328.5; 526/332
(58) Field of Search ................................ 548/255, 251, 548/260; 428/500, 515; 526/261, 328.5, 313, 332; 525/326.7, 329.9, 375

(56) References Cited

U.S. PATENT DOCUMENTS 5,760,137 A 6/1998 Miyazoe et al. ............ 525/101

U.S. PATENT DOCUMENTS 5,922,882 A 7/1999 Mori et al. ................. 548/260
6,084,104 A * 7/2000 Nakano et al. ............. 548/259

FOREIGN PATENT DOCUMENTS

JP 56-127635 10/1981

(List continued on next page.)

OTHER PUBLICATIONS

Notification of Transmittal of copies of Translation of the International Preliminary Examination Report (PCT/IB/338).

(List continued on next page.)

Primary Examiner—Paul Thibodeau
Assistant Examiner—Sheeba Ahmed
(74) Attorney, Agent, or Firm—Smith, Gambrell & Russell, LLP

(57) ABSTRACT

The present invention relates to a weather-resistant composition comprising a bisbenzotriazolylphenol compound represented by the general formula (1):

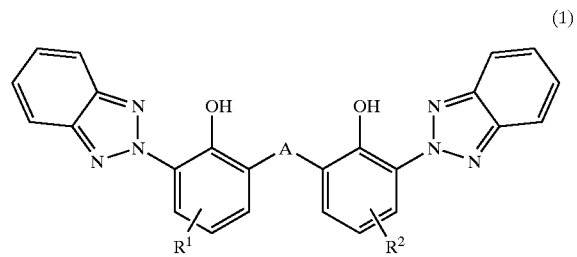

(1)

[wherein A represents an alkylene group, and $R^1$ and $R^2$ represent a group (B):

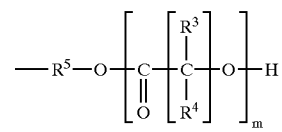

(in which $R^3$ and $R^4$ represent an alkyl group)], a meth) acrylate compound, and a curing agent; a coating material containing the weather-resistant composition as a main component; and a molded article. The composition can form a coating film which is not impaired in mechanical strength, exhibits excellent weather resistance, metal ion resistance and transparency for a prolonged period, and is less likely to cause surface cracks.

5 Claims, 1 Drawing Sheet

FOREIGN PATENT DOCUMENTS

| | | |
|---|---|---|
| JP | 3-124776 | 5/1991 |
| JP | 4-372668 | 12/1992 |
| JP | 5-255447 | 10/1993 |
| JP | 5-271203 | 10/1993 |
| JP | 9-316060 | 12/1997 |
| JP | 110-265557 | 10/1998 |
| WO | WO97/35847 | * 2/1997 |
| WO | WO98/50371 | * 11/1998 |

OTHER PUBLICATIONS

"Corrected" International Preliminary Examination Report (PCT/IPEA/409) corresponding to PCT/JP99/03715.

* cited by examiner

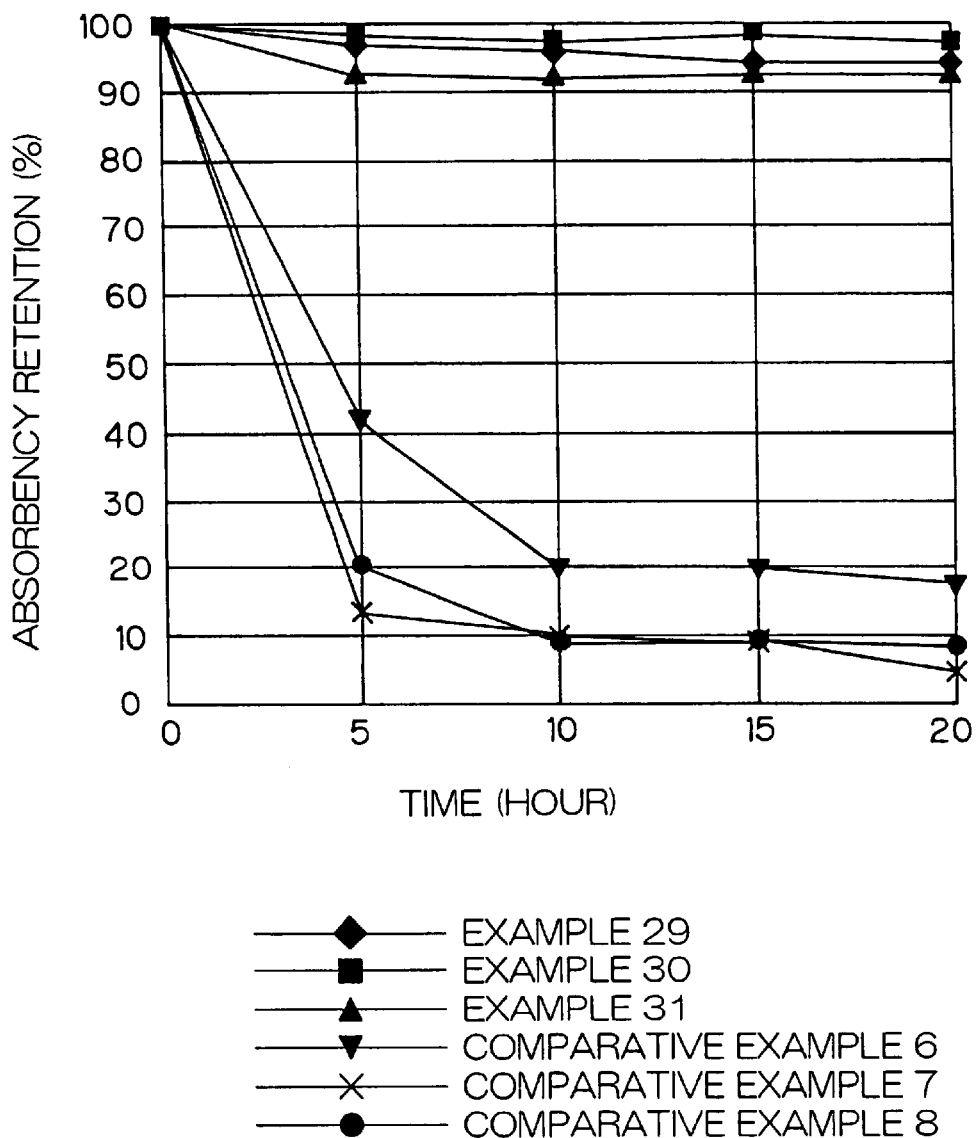

WEATHER-RESISTANT COMPOSITION, COATING MATERIALS AND MOLDED ARTICLES

TECHNICAL FIELD

The present invention relates to a weather-resistant composition, a coating material containing the composition as a principal component, and a molded article.

BACKGROUND OF THE INVENTION

Coating materials containing a (meth)acrylate compound as a coating film-forming component have widely been employed to protect the surface of a substrate because a cured coating film (hereinafter referred merely to as a "coating film" otherwise stated) thereof is superior in transparency, mechanical strength, surface smoothness, scratch resistance and close adhesion with molded articles made of various materials (hereinafter referred merely to as a "substrate" otherwise stated) and has high pencil hardness.

However, the coating film formed from the coating materials has such drawbacks that it causes discoloration or reduction in mechanical strength when exposed to ultraviolet light because of its poor weather resistance. Since the coating film formed from the coating materials is superior in transparency as described above, the substrate is also likely to be impaired by ultraviolet light, like the coating film.

To solve these drawbacks, an ultraviolet absorber is added to the coating material described above. Examples of the ultraviolet absorber include additive type ultraviolet absorbers such as benzophenone compound, benzotriazole compound, phenyl salicylate compound phenyl benzoate compound(various compounds such as those disclosed in Japanese Patent Laid-Open Gazette No. 56-127635), and cyanoacrylate compound. Among these ultraviolet absorbers, a benzotriazole compound having a wide absorption wavelength range is particularly useful.

However, any of the addition type ultraviolet absorbers described above had such problems that they are evaporated or decomposed by heating during formation of the coating film or are liable to bleed out from the surface of the coating film with a lapse of time due to rainwater, thereby making it impossible to provide a molded article with the weather resistance because they are low-molecular compounds and have poor heat resistance and poor compatibility with a resin as a coating film-forming component.

Accordingly, it is necessary to add a large amount of the addition type ultraviolet absorber in the coating material in light of loss of the ultraviolet absorber during and after formation of the coating film in order to provide the coating film with excellent weather resistance.

If a large amount of the addition type ultraviolet absorber is added in the coating material, it could cause such problems that the color of the coating film changes into ocher yellow due to an influence of light absorption thereby to impair the transparency, or cracks occur on the surface of the coating film or close adhesion between the coating film and the substrate is lowered.

The coating film containing the addition type ultraviolet absorber, especially a benzotriazole compound also has such a problem that, when it is contacted with a liquid or solid containing metal ions such as copper ion (more specifically, automobile wax and detergent), it changes the color of the coating film into brown thereby to drastically impair the transparency because of its high reactivity with metal ions (poor metal ion resistance). The reason is that a phenolic hydroxyl group in the benzotriazole compound reacts with metal ions to form a complex which can change the color of the coating film into brown.

Thus, Japanese Patent Laid-Open Gazette No. 4-372668 suggests, for example, a method of avoiding use of a large amount of an ultraviolet absorber by using two or more addition type ultraviolet absorbers having different maximum absorption wavelength ranges in combination, thereby improving the weather resistance while preventing the coating film from discoloring.

However, since two or more ultraviolet absorbers having different maximum absorption wavelength ranges are elected from the addition type ultraviolet absorbers and used in combination according to this method, the metal ion resistance of the coating film still remains poor and the ultraviolet absorber is liable to bleed out from the coating film so that the weather resistance of the coating film is not sufficiently improved. Accordingly, it is essential to use a large amount of the ultraviolet absorber to maintain good weather resistance for a prolonged period and, therefore, the above problems are likely to occur.

Japanese Patent Laid-Open Gazette Nos. 5-255447 and 5-271203 suggest a reaction type benzotriazole compound (reaction type ultraviolet absorber) represented by the general formula (2):

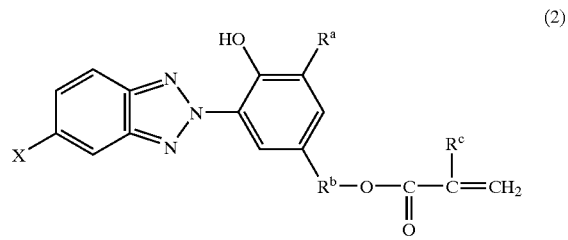

[wherein X represents a hydrogen atom or a halogen atom, $R^a$ represents a hydrogen atom, a methyl group, or a tertiary alkyl group having 4 to 6 carbon atoms, $R^b$ represents a straight-chain or branched alkylene group having 2 to 10 carbon atoms, and $R^c$ represents a hydrogen atom or a methyl group] in which a (meth)acryloyloxy group, as a functional group capable of copolymerizable with an ethylenically unsaturated monomer, is introduced into a molecule of the benzotriazole compound in place of the addition type ultraviolet absorber.

When the reaction type benzotriazole compound (2) is added in a coating material containing a coating film-forming component such as a radical polymerizable, ethylenically unsaturated monomer or oligomer capable of copolymerizable with a (meth)acryloyloxy group or a polymeric product thereof and the coating film-forming component is polymerized by heating after coating, the compound (2) is integrated by bonding (formation of a copolymer) with the resin after polymerization, thus making it possible to prevent it from bleeding out from the coating film.

When the copolymer of the reaction type benzotriazole compound (2) and the radical polymerizable, ethylenically unsaturated monomer is added in the coating material containing the coating film-forming component, not only the resulting coating material is superior in compatibility with the coating film-forming component, but also evaporation due to heating during the formation of the coating film is less likely to occur because of large molecular weight per se.

However, the compound (2) and the copolymer thereof is improved in the metal ion resistance as compared with the benzotriazole compound per se as a raw material but is not still improved sufficiently and when contacted with an automobile wax or detergent for a prolonged time, it gradually forms a complex with metal ions contained in the automobile wax thereby to change the color of the coating film into brown.

Japanese Patent Laid-Open Gazette No. 9-316060 describes a reaction type bisbenzotriazolylphenol compound (hereinafter referred to as a "bisbenzotriazolylphenol compound (3)") represented by the general formula (3):

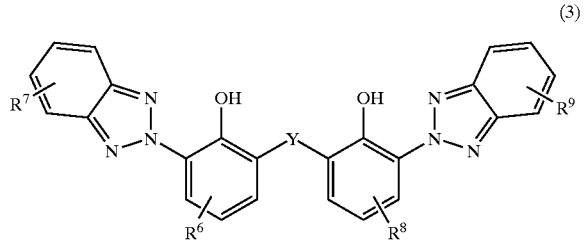

(3)

[wherein Y is directly bonded or represents an alkylene group having 1 to 6 carbon atoms, a group of —C(CH$_3$)$_2$—, a group of —C(C$_2$H$_5$)(CH$_3$)—, a group of —O—, or a group of —NH—, R$^6$ and R$^8$ are the same or different and represent a hydroxyl group, or a straight-chain or branched hydroxyalkyl group having 1 to 12 carbon atoms, and R$^7$ and R$^9$ are the same or different and represent a hydrogen atom, an alkyl group having 1 to 4 carbon atoms, an aryl group, an alkoxy group having 1 to 4 carbon atoms, or a halogen atom].

The bisbenzotriazolylphenol compound (3) can provide the coating film with excellent weather resistance by the addition of a smaller amount as compared with a conventional ultraviolet absorber because it has a structure of dimerized benzotriazolylphenol and has large ultraviolet absorbability per unit weight.

In addition, the bisbenzotriazolylphenol compound (3) does not bleed out from the coating film because a hydroxyl group other than a phenolic hydroxyl group in a molecule of the compound (3), e.g. reactive group such as hydroxyalkyl group, is integrated by bonding with the coating film-forming component such as (meth)acrylate compound. The bisbenzotriazolylphenol compound (3) is scarcely decomposed or evaporated by heating because of its large molecular weight.

The bisbenzotriazolylphenol compound (3) has such a structure that one benzotriazolylphenol in the same molecule serves as an adjacent bulky substituent to a phenolic hydroxyl group of the other benzotriazolylphenol, thereby to protect the phenolic hydroxyl group and to prevent the formation of a complex with metal ions. Accordingly, the reactivity with metal ions is very poor and, therefore, contact with an automobile wax or detergent for a prolonged period does not change the color of the coating film into brown.

However, the bisbenzotriazolylphenol compound (3) is inferior in the compatibility with a (meth)acrylate compound as the coating film-coating component and the solubility in an organic solvent used widely as an auxiliary component of the coating material so that the state of being dispersed in the coating material becomes uniform sometimes, thereby to impair the surface smoothness of the coating film and mechanical strength.

DISCLOSURE OF THE INVENTION

An object of the present invention is to provide a novel weather-resistant composition which can form a coating film which is not impaired in mechanical strength, exhibits excellent weather resistance, metal ion resistance and transparency for a prolonged period, and is less likely to cause surface cracks.

Another object of the present invention is to provide a coating material containing the weather-resistant composition as a main component, and a molded article coated with a coating film formed from the coating material.

The present inventors have intensively studied to solve the problems of the prior art described above and found a fact that coating of the surface of a substrate with a composition containing an ultraviolet absorber represented by the following general formula (1) and a specific (meth)acrylate compound makes it possible to form a coating film, which is not impaired in mechanical strength, exhibits excellent whether resistance, metal ion resistance and transparency for prolonged period, and is less likely to cause surface cracks, in the surface of the substrate. Thus, the present invention has been completed.

That is, the present invention provides a weather-resist composition comprising:

(I) a bisbenzotriazolylphenol compound as an ultraviolet absorber, which is represented by the general formula (1):

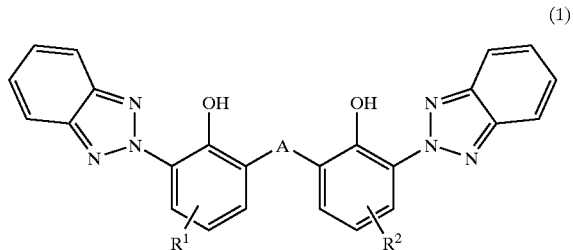

(1)

[wherein A is directly bonded, or represents a methylene group which have a substituent, a straight-chain or branched alkylene group having 2 to 6 carbon atoms, a group of —C—, or a group of —NH—, and R$^1$ and R$^2$ are the same or different and represent a group (B):

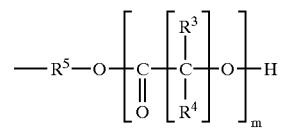

(in which R$^5$ is directly bonded, or represents a straight-chain or branched alkylene group having 1 to 12 carbon atoms, R$^3$ and R$^4$ are the same or different and represent a hydrogen atom or an alkyl group having 1 to 10 carbon atoms, m represents an integer of 1 to 20, and n represents an integer of 4 to 8)];

(II) at least one (meth)acrylate compound as a coating film-forming component, which is selected from (meth)acrylate monomer and (meth)acrylate oligomer; and (III) a curing agent; a coating material containing the weather-resistant composition as a main component; and a molded article, partial or whole surface of which is coated with the coating material.

The bisbenzotriazolylphenol compound (hereinafter referred to as a "bisbenzotriazolylphenol compound (1)") of the general formula (1) used as the ultraviolet absorber in the present invention can provide the coating film with excellent weather resistance by the addition of a smaller amount as compared with a conventional ultraviolet absorber because it has a structure of dimerized benzotriazolylphenol and has large ultraviolet absorbability per unit weight, like the bisbenzotriazolylphenol compound (3) disclosed in the aforementioned Japanese Patent Laid-Open Gazette No. 9-316060.

Therefore, according to the weather-resistant composition containing the bisbenzotriazolylphenol compound (1) as the ultraviolet absorber according to the present invention, it is made possible to form a coating film which exhibits excellent weather resistance while maintaining excellent transparency as described above and is less likely to cause surface cracks.

The bisbenzotriazolylphenol compound (1) has such a structure that two benzotriazolylphenols in the same molecule serve as adjacent bulky substituents to a phenolic hydroxyl group of the other benzotriazolylphenol, thereby to protect the phenolic hydroxyl group and to prevent the formation of a complex with metal ions, which can change the color of the coating film into brown, due to poor reactivity with metal ions.

Accordingly, the coating film formed by using the coating material comprising the weather-resistant composition of the present invention is superior in metal ion resistance for a prolonged period and is less likely to change the color into brown.

Since the bisbenzotriazolylphenol compound (1) has a large molecular weight and a high decomposition temperature (excellent heat resistance) as compared with a conventional ultraviolet absorber because of its structure of dimerized benzotriazolylphenol as described above, it is not evaporated or decomposed by heating during the formation of the coating film.

Since the bisbenzotriazolylphenol compound (1) has a large molecular weight and also has a reactive group (B) (long-chain polyester group) capable of being integrated by bonding with the coating film-forming component in a molecule, it is made possible to prevent it from bleeding out from the surface of the coating film more securely.

Accordingly, the coating film formed by using the coating material comprising the weather-resistant composition of the present invention is superior in weather resistance and transparency for a prolonged period.

Furthermore, the long-chain polyester group of the bisbenzotriazolylphenol compound (1) is remarkably superior in the compatibility with the (meth)acrylate compound as the coating film-forming component and the solubility in an organic solvent, thereby scarcely impairing the surface smoothness and mechanical strength of the coating film as well as close adhesion with the substrate. Accordingly, even if a large amount of the bisbenzotriazolylphenol compound (1) is added in the coating material, it does not exert an adverse influence on the transparency and mechanical strength of the coating film, like a conventional ultraviolet absorber.

According to the weather-resistant composition of the present invention, it is made possible to provide the coating film with remarkably excellent metal ion resistance, weather resistance and transparency for a prolonged period without impairing original properties of the coating film containing the (meth)acrylate compound as the coating film-forming component, i.e. excellent transparency, mechanical strength, surface smoothness, wear resistance, scratch resistance, and close adhesion with the substrate. Also the weather-resistant composition of the present invention can provide the coating film with excellent chemical resistance for a prolonged period.

Therefore, even if the coating film formed by using the coating material comprising the weather-resistant composition of the present invention is exposed to factors accelerating deterioration of the coating film, e.g., ultraviolet light, automobile wax or detergent, for a prolonged period, discoloration of the coating film as well as lowering of the mechanical strength and the close adhesion with the substrate do not occur. Therefore, the coating film is very useful to protect the substrate.

BRIEF DESCRIPTION OF THE DRAWINGS

FIG. 1 is a graph showing the results of a dissolution test of an ultraviolet absorption component in an aqueous 95% methanol solution in Experiment 2.

BEST MODE FOR CARRYING OUT THE INVENTION

The present invention will be described in detail hereinafter.

The weather-resistant composition of the present invention contains (I) a bisbenzotriazolylphenol compound represented by the general formula (1) as an ultraviolet absorber, (II) a (meth)acrylate compound as a coating film-forming component, and (III) a curing agent.

First, the ultraviolet absorber as one of components of the weather-resistant composition will be described.

[Bisbenzotriazolylphenol Compound (1)]

In the bisbenzotriazolylphenol compound represented by the general formula (1), the methylene group corresponding to A which may have a substituent includes, for example, ethylidene, propylidene, isopropylidene, or 2-butylidene, in addition to methylene. The straight-chain or branched alkylene group having 2 to 6 carbon atoms includes, for example, a straight-chain or branched alkylene group such as ethylene, trimethylene, tetramethylene, pentamethylene, hexamethylene, 2-methyltrimethylene, or 2,2-dimethyltrimethylene. In the present invention, a straight-chain alkylene group is preferable, and methylene is more preferable, among these methylene groups.

The alkyl group having 1 to 10 carbon atoms corresponding to $R^3$ and $R^4$ includes, for example, a straight-chain or branched alkyl group such as methyl, ethyl, propyl, isopropyl, butyl, tert-butyl, amyl, hexyl, peptyl, or octyl. Among these alkyl groups, a straight-chain or branched alkyl group having about 1 to 3 carbon atoms, such as methyl, ethyl, propyl, or iso-propyl is preferable.

Among groups corresponding to $R^3$ and $R^4$, a hydrogen atom is particularly preferable. The straight-chain or branched alkylene group having 1 to 12 carbon atoms corresponding to $R^5$ includes, for example, heptamethylene, octamethylene, nonamethylene, decamethylene, undecamethylene, or dodecamethylene, in addition to the alkylene group having 1 to 6 carbon atoms described above.

In the long-chain polyester (B), m is an integer of 1 to 20, and preferably an integer of 2 to 10. By arbitrary changing the number m of repeating units of this long-chain polyester (B), the compound can take any form of crystal, wax, or oil.

In the long-chain polyester (B), n is an integer of 4 to 8. By arbitrary changing the number n of repeating units, the compatibility with the (meth)acrylate compound as the coating film-forming component and the solubility in an organic solvent are improved. As a result, the bisbenzotriazolylphenol compound (1) is uniformly dispersed in the coating material and the surface smoothness and mechanical strength of the coating film are not likely to be impaired.

Specific examples of the bisbenzotriazolylphenol compound (1) include 2,2'-methylenebis[6-(2H-1,2,3- benzotriazol-2-yl)-4-(glycoloyloxyethyl)phenol], 2,2'-methylenebis[6-(2H-1,2,3-benzotriazol-2-yl)-4-(3-hydroxypropanoyloxyethyl)phenol], 2,2'-methylenebis[6-(2H-1,2,3-benzotriazol-2-yl)-4-(4-hydroxybutanoyloxyethyl)phenol], 2,2'-methylenebis[6-(2H-1,2,3-benzotriazol-2-yl)-4-(5-hydroxyheptanoyloxyethyl)phenol], 2,2'-methylenebis[6-(2H-1,2,3-benzotriazol-2-yl)-4-(6-hydroxyhexanoyloxyethyl)phenol], 2,2'-methylenebis[6-(2H-1,2,3-benzotriazol-2-yl)-4-(16-hydroxy-4,11-dioxo-3,10-dioxahexadecyl)phenol], 2,2'-methylenebis[6-(2H-1,2,3-benzotriazol-2-yl)-4-(24-hydroxy-4,11,18-trioxo-3,10,17-trioxatrycosyl)phenol], 2,2'-methylenebis[6-(2H-1,2,3-benzotriazol-2-yl)-4-(31-hydroxy-4,11,18,25-tetraoxo-3,10,17,24-tetraoxahexadecyl)phenol], and 2,2'-methylenebis[6-(2H-1,2,3-benzotriazol-2-yl)-4-(37-hydroxy-4,11,18,25,32-heptaoxo-3,10,17,24,31-heptaoxaheptatriacontyl)phenol]. These compounds can be used alone or in combination.

The bisbenzotriazolylphenol compound (1) can be prepared, for example, by ring-opening addition polymerization of a bisbenzotriazolylphenol compound (3) disclosed in Japanese Patent Laid-Open Gazette No. 9-316060 and lactones represented by the general formula (4):

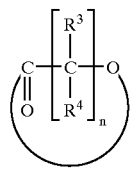

(4)

wherein $R^3$, $R^4$ and n are as defined above (hereinafter referred to as "lactones (4)").

Known compounds can be used as the bisbenzotriazolylphenol compound (3) and specific compounds are 2,2'-methylenebis[6-(2H-1,2,3-benzotriazol-2-yl)-4-(2-hydroxyethyl)phenol], 2,2'-methylenebis[6-(2H-1,2,3-benzotriazol-2-yl)-4-(3-hydroxypropyl)phenol], and 2,2'-methylenebis[6-(2H-1,2,3-benzotriazol-2-yl)-4-(4-hydroxybutyl)phenol].

Known compounds can be used as the lactones (4) and examples thereof are ε-caprolactone, trimethyl-ε-caprolactone, monomethyl-ε-caprolactone, γ-butyrolactone, and δ-valerolactone.

The ring-opening addition polymerization of the lactones (4) may be conducted, for example, the bisbenzotriazolylphenol compound (3) and lactones (4) may be reacted in the presence of a catalyst for ring-opening addition polymerization.

The catalyst includes, for example, organotitanium compound such as tetraethyl titanate, tetrabutyl titanate, or tetrapropyl titanate; organotin compound such as stannous octylate, dibutyltin oxide, dibutyltin laurate, or mono-n-butyltin fatty acid; or stannous halide such as stannous chloride, stannous bromide, or stannous iodide.

The amount of the catalyst is usually within a range from about 0.1 to 10000 ppm, and preferably from about 1 to 5000 ppm, based on the bisbenzotriazolylphenol compound (3).

The ring-opening addition polymerization reaction is usually conducted at the temperature within a range from about 90 to 240° C., and preferably from about 100 to 220° C., and completed within about 3 to 24 hours, and preferably about 4 to 10 hours.

Next, the coating film-forming component as the other component in the weather-resistant composition of the present invention will be described.

[(Meth)acrylate Compound]

In the weather-resistant composition of the present invention, known compounds can be used as the (meth)acrylate compound for the coating film-forming component and the compound is at least one selected from (meth)acrylate monomer having at least one (meth)acryloyloxy group in a molecule (hereinafter referred merely to as a "(meth)acrylate monomer" unless otherwise stated) and (meth)acrylate oligomer having at least one (meth)acryloyloxy group in a molecule (hereinafter referred merely to as a "(meth)acrylate oligomer" unless otherwise stated).

For example, these (meth)acrylate compounds are described in Journal of "Fine Chemical", Vol. 21, No. 3 (pages 16 to 28, issued in 1992), Journal of "Fine Chemical", Vol. 21, No. 4 (pages 16 to 25, issued in 1992), and Journal of "Functional Material", Vol. 12, No. 8 (pages 52 to 58, issued in 1992).

The (meth)acrylate monomer includes, for example, polyfunctional(meth)acrylate monomer having at least two (meth)acryloyloxy groups in a molecule, or monofunctional (meth)acrylate monomer having at least one (meth) acryloyloxy group in a molecule.

Specific examples of the polyfunctional(meth)acrylate monomer among the (meth)acrylate monomers are bisphenol A di(meth)acrylate, bisphenol A bis(ethylene oxide-modified(meth)acrylate)ester, bisphenol A bis(propylene oxide-modified(meth)acrylate)ester, bisphenol F bis (ethylene oxide-modified(meth)acrylate)ester, bisphenol S bis(ethylene oxide-modified(meth)acrylate)ester, tetrabromobisphenol A di(meth)acrylate, ethylene glycol di(meth) acrylate, diethylene glycol di(meth)acrylate, ethylene glycol bis(epichlorohydrin-modified(meth)acrylate)ester, glycerol di(meth)acrylate, glycerol tri(meth)acrylate, glycerol tris (epichlorohydrin-modified(meth)acrylate)ester, 1,4-butanediol di(meth)acrylate, 1,4-butanediol bis (epichlorohydrin-modified(meth)acrylate)ester, 1,6-hexanediol di(meth)acrylate, 1,6-hexanediol bis (epichlorohydrin-modified(meth)acrylate)ester, neopentyl glycol di(meth)acrylate, neopentyl glycol di(meth)acrylate hydroxypivalate, hydroxy pivalic acid neopentyl bis (caprolactone-modified(meth)acrylate)ester, trimethylolpropane tri(meth)acrylate, trimethylolpropane tris(ethylene oxide-modified(meth)acrylate)ester, trimethylolpropane tris (propylene oxide-modified(meth)acrylate)ester, trimethylolpropane bis(epichlorohydrin-modified(meth)acrylate)ester, trimethylolpropane bis(neopentyl glycol-modified(meth) acrylate)ester, dicyclopentanyl di(meth)acrylate, pentaerythritol tri(meth)acrylate, pentaerythritol tetramethylolpropane tri(meth)acrylate, dipentaerythritol hexa(meth)acrylate, dipentaerythritol hexakis(caprolactone-modified(meth) acrylate)ester, dipentaerythritol monohydroxypenta(meth) acrylate, dipentaerythritol pentakis(alkyl-modified(meth) acrylate)ester, dipentaerythritol tetrakis(alkyl-modified (meth)acrylate)ester, dipentaerythritol tris(alkyl-modified (meth)acrylate)ester, ditrimethylolpropane tetra(meth) acrylate, diethylene glycol di(meth)acrylate, polyethylene glycol di(meth)acrylate, polyethylene glycol bis (epichlorohydrin-modified(meth)acrylate)ester, tripropyleneglycol di(meth)acrylate, polypropylene glycol di(meth) acrylate, polypropylene glycol bis(epichlorohydrin-modified(meth)acrylate)ester, phosphoric acid bis(ethylene oxide-modified(meth)acrylate)ester, phosphoric acid tris (ethylene oxide-modified(meth)acrylate)ester, phosphoric acid bis(caprolactone-modified(meth)acrylate)ester, phthalic acid bis(epichlorohydrin-modified(meth)acrylate) ester, tris{(meth)acryloyloxyethyl}isocyanurate, isocyanurate tris(caprolactone-modified(meth)acryloyloxyethyl)

ester, and zinc(meth)acrylate. The polyfunctional(meth) acrylate monomer further includes a phosphazene compound having a (meth)acryloyloxy group, such as hexa{(meth)acryloyloxyethoxy}cyclotriphosphazene or octa{(meth)acryloyloxyethyl}cyclotriphosphazene. These polyfunctional(meth)acrylate monomers may be a mixture of acrylate and methacrylate, such as glycerol(meth) acrylate.

Among these polyfunctional(meth)acrylate monomers, ethylene glycol di(meth)acrylate, diethylene glycol di(meth) acrylate, 1,4-butanediol di(meth)acrylate, 1,6-hexanediol di(meth)acrylate, neopentyl glycol di(meth)acrylate, neopentyl glycol di(meth)acrylate hydroxypivalate, trimethylolpropane tri(meth)acrylate, and pentaerythritol tri(meth) acrylate can be preferably used.

Specific examples of the monofunctional(meth)acrylate are methyl(meth)acrylate, ethyl(meth)acrylate, propyl (meth)acrylate, butyl(meth)acrylate, isobutyl(meth)acrylate, hexyl(meth)acrylate, 2-ethylhexyl(meth)acrylate, isodecyl (meth)acrylate, lauryl(meth)acrylate, stearyl(meth)acrylate, allyl(meth)acrylate, cyclohexyl(meth)acrylate, methylcyclohexyl(meth)acrylate, isobornyl(meth)acrylate, 2-hydroxyethyl(meth)acrylate, 2-hydroxypropyl(meth) acrylate, caprolactone-modified2-hydroxyethyl(meth) acrylate, glycerol(meth)acrylate, glycidyl(meth)acrylate, 3-chloro-2-hydroxypropyl(meth)acrylate, 2,3-dibromopropyl(meth)acrylate, 2-cyanoethyl(meth)acrylate, tetrahydrofurfuryl(meth)acrylate, caprolactone-modified tetarhydrofurfuryl(meth)acrylate, dicyclopentanyl(meth) acrylate, dicyclopentenyloxyethyl(meth)acrylate, N,N-dimethylaminoethyl(meth)acrylate, N,N-diethylaminoethyl (meth)acrylate, trifluoroethyl(meth)acrylate, tetrafluoropropyl(meth)acrylate, octafluoropentyl(meth) acrylate, heptadecafluorodecyl(meth)acrylate, benzyl(meth) acrylate, 2-ethoxyethyl(meth)acrylate, 2-(2-ethoxyethyl) (meth)acrylate, 2-(2-ethoxyethoxy)ethyl(meth)acrylate, butoxyethyl(meth)acrylate, 2-methoxyethyl(meth)acrylate, methoxydiethylene glycol(meth)acrylate, methoxytriethylene glycol(meth)acrylate, methoxypolyethylene glycol (meth)acrylate, 2-methoxypropyl(meth)acrylate, methoxydipropylene glycol(meth)acrylate, methoxytripropylene glycol(meth)acrylate, methoxypolypropylene glycol(meth) acrylate, polyethylene glycol(meth)acrylate, polypropylene glycol(meth)acrylate, polyethylene glycol/polypropylene glycol(meth)acrylate, neopentylglycol(alicyclic-modified (meth)acrylate)ester, phosphoric acid(ethylene oxide-modified (meth)acrylate)ester, butoxylated phosphoric acid (ethylene oxide-modified(meth)acrylate)ester, phenoxylated phosphoric acid(ethylene oxide-modified (meth)acrylate) ester, trimethoxysilyl propyl(meth)acrylate, sodium sulfonate(meth)acrylate, succinic acid(ethylene oxide-modified(meth)acrylate)ester, morpholine(meth)acrylate, phenoxy(meth)acrylate, phenoxyethyl(meth)acrylate, phenoxydiethylene glycol(meth)acrylate, phthalic acid(ethylene oxide-modified(meth)acrylate)ester, phthalic acid(propylene oxide-modified(meth)acrylate)ester, amide(meth)acrylate, N,N'-dimethylaminoethyl(meth)acrylate, and(meth)acrylic acid.

Among these monofunctional(meth)acrylate monomers, (meth)acrylic acid, hydroxyethyl(meth)acrylate, hydropropyl(meth)acrylate, amide(meth)acrylate, glycidyl (meth)acrylate, methyl(meth)acrylate, ethyl(meth)acrylate, butyl(meth)acrylate, isobutyl(meth)acrylate, hexyl (meth) acrylate and 2-ethylhexyl(meth)acrylate are preferably used.

The (meth)acrylate oligomer includes, for example, a polyfunctional(meth)acrylate oligomer having at least two (meth)acryloyloxy groups in a molecule.

The polyfunctional(meth)acrylate oligomer includes, for example, polyfunctional polyester(meth)acrylate oligomer, polyfunctional urethane(meth)acrylate oligomer, polyfunctional epoxy(meth)acrylate oligomer, or polyfunctional ether(meth)acrylate oligomer.

The polyfunctional polyester(meth)acrylate oligomer is a compound prepared by synthesizing a (meth)acrylic acid, a polyhydric alcohol, and a polybasic acid(anhydride).

Examples of the polyhydric alcohol are ethylene glycol, 1,4-butanediol, 1,6-hexanediol, diethylene glycol, triethylene glycol, polyethylene glycol, propylene glycol, dipropylene glycol, polypropylene glycol, neopentyl glycol, dimethylolheptane, dimethylolpropionic acid, dimethylolbutyrionic acid, trimethylolethane, trimethylolpropane, ditrimethylolpropane, pentaerythritol, dipentaerythritol, and glycerin.

Examples of the polybasic acid(anhydride) are malonic acid, (anhydrous)succinic acid, alkenylsuccinic acid, glutaric acid, adipic acid, pimelic acid, cork acid, azelaic acid, sebacic acid, isosebacic acid, (anhydrous)maleic acid, fumaric acid, (anhydrous) itaconic acid, (anhydrous)phthalic acid, isophthalic acid, terephthalic acid, and (anhydrous) trimellitic acid.

The polyfunctional urethane(meth)acrylate oligomer is a compound prepared, for example, by reacting polyisocyanate, polyol and hydroxy(meth)acrylate described in Journal of "Fine Chemical", Vol. 17, No. 19 (pages 5 to 14, issued in 1988) and Journal of "Fine Chemical", Vol. 17, No. 20 (pages 14 to 25, issued in 1988).

Examples of the polyisocyanate include di- and tri-isocyanate such as hexamethylene diisocyanate, isophorone diisocyanate, methylenebis(4-cyclohexyl isocyanate), trimethylhexamethylene diisocyanate, tolylene diisocyanate, xylylene diisocyanate, 4,4'-diphenylmethane diisocyanate, diisocyanate obtained by hydrogenating an aromatic isocyanate (e.g. hydrogenated tolylene diisocyanate, hydrogenated xylylene diisocyanate, or dicyclohexylmethane diisocyanate), triphenylmethane triisocyanate, or dimethylenetriphenyl triisocyanate, and polyisocyanate obtained by polymerizing the di- and tri-isocyanate.

Examples of the polyol are aliphatic, alicylic and aromatic polyols, polyester polyol, and polyether polyol.

Examples of the aliphatic polyol, alycyclic polyol and polyether polyol are ethylene glycol, 1,4-butanediol, 1,6-hexanediol, diethylene glycol, triethylerie glycol, polyethylene glycol, propylene glycol, dipropylene glycol, polypropylene glycol, neopentyl glycol, dimethylolheptane, dimethylolpropionic acid, dimethylolbutyrionic acid, trimethylolethane, trimethylolpropane, ditrimethylolpropane pentaerythritol, dipentaerythritol, glycerin, and hydrogenated bisphenol A.

Examples of the aromatic polyol are ethoxylated bisphenol A and ethoxylated bisphenol S.

The polyester polyol includes, for example, caprolactone-modified diol. Examples of the hydroxy (meth)acrylate are 2-hydroxyethyl(meth)acrylate, 2-hydroxypropyl(meth) acrylate, 4-hydroxybutyl(meth)acrylate, glycerol di(meth) acrylate, glycerol(meth)acrylate, and pentaerythritol tri (meth)acrylate.

The polyfunctional epoxy(meth)acrylate oligomer includes, for example, a compound obtained by the addition reaction of polyglycidyl ether and (meth)acrylic acid. Examples of the polyglycidyl ether are ethylene glycol diglycidyl ether, propylene glycol diglycidyl ether, tripropylene glycol diglycidyl ether, 1,6-hexanediol diglycidyl ether, and bisphenol A diglycidyl ether.

As the polyfunctional ether(meth)acrylate oligomer, there can be used, for example, a compound obtained by ester exchange of polyether, which is obtained by reacting polyol with ethylene oxide or propylene oxide, and ethyl(meth) acrylate. Examples of the polyol are glycerin and hexanetriol.

Among the oligomers described above, polyfunctional polyester(meth)acrylate oligomer, polyfunctional urethane (meth)acrylate oligomer, polyfunctional epoxy(meth) acrylate oligomer and polyfunctional ether(meth)acrylate oligomer, which are prepared from the aliphatic or alicyclic compound for the purpose of improvement in weather resistance, can be preferably used.

These (meth)acrylate compounds may be used alone or in combination.

The monomer may be used in combination with a polymerizable monomer made of the other resin, such as styrene, in light of uses and properties of the coating film.

[Curing agent]

The curing agent in the weather-resistant composition of the present invention includes, for example, one or more curing agents selected from the group consisting of curing catalyst, thermopolymerization initiator, polymerization accelerator, photopolymerization initiator, photopolymerization accelerator, crosslinking agent, and melamine curing agent.

The curing catalyst is used to accelerate curing of the coating film-forming component due to heating. As the curing catalyst, any of those used generally in this field can be used. Examples thereof include acid catalyst, basic caatlyst, and metal chelete catalyst.

The thermopolymerization initiator is used to accelerate curing with polymerization of the coating film-forming component. As the thermopolymerization initiator, known thermopolymerization initiators can be used. Examples thereof include peroxide such as benzoyl peroxide, dicumyl peroxide, or diisopropyl peroxycarbonate; and azo compound such as 2,2-azobisisobutyronitrile, azobis-2,4-dimethylvarelonitrile, azobiscyclohexylnitrile, azobiscyanovaleric acid, or 2,2-azobis(2-methylbutyronitrile).

The polymerization accelerator can be used in combination with the polymerization initiator to accelerate curing with polymerization of the coating film-forming component. As the polymerization accelerator, known polymerization accelerators can be used. Examples thereof include triethanolamine, methyldiethanolamine, triisopropanolamine, methyl 4-dimethylaminobenzoate, ethyl 4-dimethylaminobenzoate, isoamyl 4-dimethylaminobenzoate, amyl 4-dimethylaminobenzoate, 4-dimethylaminobenzoic acid-2-ethylhexyl, N,N-dimethylparatoluidine, 4,4'-dimethylaminobenzophenone, and 4,4,-diethylaminobenzophenone. The photopolymerization initiator is used when the coating film-forming component is cured with polymerization by irradiating with visible light, or ionizing radiation such as electron beam or ultraviolet light, especially ultraviolet light. As the photopolymerization initiator, there can be used any of conventionally known various photopolymerization initiators described in "Fine Chemical" (Vol. 22, No. 20, pages 16 to 33, 1993) such as acetophenone, bezoin ether, benzophenone and thioxanthone photopolymerization initiators.

Examples of the acetophenone photopolymerization initiator are diethoxyacetophenone, 2-hydroxy-2-methyl-1-phenylpropan-1-one, 1-(4-isopropylphenyl)-2-hydroxy-2-methylpropan-1-one, 1-(4-dodecylphenyl)-2-hydroxy-2-methylpropan-1-one, 4-(2-hydroxyethoxy)phenyl-(2-hydroxy-2-propyl)ketone, 1-hydroxycyclohexyl-phenylketone, 2-methyl-1-[4-(methylthio)phenyl]-2-morpholinopropanone-1,2-benzyl-2-diethylamino-1-(4-morpholinophenyl)-butanone-1,4-phenoxydichloroacetophenone, 4-tert-butyldichloroacetophenone, and 4-tert-butyltrichloroacetophenone.

Examples of the benzoin ether photopolymerization initiator are benzoin, benzoin methyl ether, benzoin ethyl ether, benzoin isopropyl ether, benzoin isobutyl ether, and benzyl dimethyl ketarl.

Examples of the benzophenone photopolymerization initiator are benzophenone, ortho-benzoylbenzoic acid, methyl ortho-benzoylbenzoate, 4-phenylbenzophenone, 4-hydroxybenzophenone, and 2,4,6-trimethylbenzophenone.

Examples of the thioxanthone photopolymerization initiator are thioxanthone, 2-chlorothioxanthone, 2-methylthioxanthone, 2,4-dimethylthioxanthone, 2-isopropylthioxanthone, 2,4-diisopropylthioxanthone, 2,4-diethylthioxanthone, 2,4-dichlorothioxanthone, and 1-chloro-4-popoxythioxanthone.

Special acylphosphine oxide such as 2,4,6-trimethylbenzoylphenylphosphine oxide can also be used as the photopolymerization initiator. Furthermore, benzyl, 9,10-phenanthrenequinone, 2-ethylantharquinone, camphorquinone, methylphenylglyoxy ether and 3,3',4,4'-tetra(tert-butylperoxycarbonyl)benzophenone can be used. The photopolymerization initiators described above can be used alone or in combination.

The auxiliary photopolymerization initiator can be used in combination with the photopolymerization initiator to accelerate curing with polymerization of the coating film-forming component. As the auxiliary photopolymerization initiator, for example, there can be used those which have already been listed as the polymerization accelerator.

The crosslinking agent is used to crosslink a coating film-forming component to form the coating film which has higher strength and more excellent close adhesion. Specifically, a two-pack curing type urethane resin coating material can be prepared by adding a crosslinking agent such as polyisocyanate compound to the weather-resistant composition of the present invention.

The polyisocyanate compound is not specifically limited as far as it is polyisocyanate having two or more isocyanate groups in a molecule, and examples thereof include trimethylene diisocyanate, 1,6-hexamethylene diisocyanate, tolylene diisocyanate, diphenylmethane diisocyanate, and isophorone diisocyanate. These polyisocyanate compounds can be used alone or in combination. Also a known catalyst such as di-n-butyltin dilaurate or tertiary amine can be added to the two-pack curing type urethane resin coating material.

The melamine curing agent is not specifically limited as far as it is melamine or a derivative thereof (e.g. alkyl derivative, alkoxyalkyl derivative). Specific examples are preferably commercially available and are SAIMEL 300, SAIMEL 301, SAIMEL 303, SAIMEL 350, SAIMEL 370, SAIMEL 771, SAIMEL 325, SAIMEL 327, SAIMEL 703, SAIMEL 712, SAIMEL 701, SAIMEL 266, SAIMEL 267, SAIMEL 285, SAIMEL 232, SAIMEL 235, SAIMEL 236, SAIMEL 238, SAIMEL 272, SAIMEL 212, SAIMEL 253, SAIMEL 254, SAIMEL 202, SAIMEL 207, MYCOAT 506, AND MYCOAT 508, which are manufactured by Mitsui CYTEC, Ltd.

Among the curing agents described above, the photopolymerization initiator, crosslinking agent or melamine curing agent is used particularly preferable.

[Weather-resistant Composition]

The weather-resistant composition may contain known additives such as antioxidants, surfactants, leveling agents, thermopolymerization inhibitors, and solvents as far as the objects are not adversely affected. These additives can be used alone or in combination.

Known ultraviolet absorbers other than the bisbenzotriazolylphenol compound (1) used in the present invention (e.g. bisbenzotriazolylphenol compound (3)) may be added. These additives can be used alone or in combination.

As the antioxidant, for example, compounds described in "Antioxidant Handbook" (edited by Kenichi SARUWATARI et al., Taisei-Sha, 1976) and "Plastics" (Vol. 43, No. 11, pages 52 to 54, 1992) such as phenol sulfur, phosphorous and amine compounds can be used.

Examples of the phenol antioxidant are 2,6-di-tert-butyl-4-methylphenol, pentaerythritol-tetrakis[3-(3',5'-di-tert-butyl-4'-hydroxyphenyl)-propionate], octadecyl-3-[3-(3',5'-di-tert-butyl-4'-hydroxyphenyl)-propionate], 2,2'-methylenebis(4-methyl-6-tert-butylphenol), 2,2'-methylenebis(4-ethyl-6-tert-butylphenol), 4,4'-butylidenebis(3-methyl-6-tert-butylphenol), 4,4,'-thiobis(3-methyl-6-tert-butylphenol), 2,4-bis-(n-octylthio)-6-(4''-hydroxy-3',5'-tert-butylanilino)-1,3,5-triazine, 2,2'-thiodiethylenebis[3-(3'5'-di-tert-butyl-4'-hydroxyphenyl)-propionate], N,N'-hexamethylenebis(3,5-di-tert-butyl-4-hydroxyhydrocinnamide), and 3,9-{2-[3-(3-tert-butyl-4-hydroxy-5-methylphenyl)propionyloxy]-1,1-dimethylethyl}-2,4,8,10-tetraoxaspiro[5,5]undecane.

Examples of the sulfur antioxidant are dilauryl-3,3'-thiodipropionate, ditridecyl-3,3'-thiodipropionate, dimyristyl-3,3'-thiodipropionate, distearyl-3,3'-thiodipropionate, pentaerythritol-tetrakis(3-laurylthiopropionate), bis{2-methyl-4-(3-n-$C_{12}$ or $C_{14}$ alkylthiopropionyloxy)-5-tert-butylphenyl}sulfide, and 2-mercaptobenzimidazole.

Examples of the phosphorous antioxidant are tris(nonylphenyl)phosphate, triphenyl phosphate, tris(2,4-di-tert-butylphenyl)phosphate, diphenylisodecyl phosphate, diphenylisooctyl phosphate, disteraylpentaerythritol diphosphate, di(2,4-di-tert-butylphenyl)pentaerythritol dihosphate, and tetrakis(2,4-di-t-tert-butylphenyl)-4,4'-bisphenylene phosphonate.

The amine antioxidant includes, for example, alkylated diphenylamine. Also synergists for antioxidants and other stabilizers such as didodecyl-3,3'-thiobispropionate, dioctadecyl-3,3'-thiobispropionate and hexamethylphosphorictriamide can be appropriately used in combination.

Examples of the surfactant are anionic, cationic, nonionic and amphoteric surfactants described in "New Surfactants" (edited by Hiroshi HORIGUCHI, Sankyo Publication, 1986).

Examples of the leveling agent are polyvinyl butyral, polyalkyl acrylate, and dimethylsiloxane.

Examples of the thermopolymerization inhibitor are hydroquinone, methoquinone, benzoquinone, and 2,6-di-tert-butyl-4-methylphenol.

Examples of the photostabilizer are hindered amine compounds described in "Journal of the Society of Color Material", Vol. 62, No. 4 (pages 215 to 222, issued in 1989).

The solvent is used to control the viscosity of the coating material and to improve the smoothness, uniformity, close adhesion to a substrate, and coating workability of the coating film.

Various solvents can be used and examples thereof include water; alcohols such as ethanol, propanol, isopropanol, butanol, ethylene glycol, and glycerin; aromatic hydrocarbons such as toluene and xylene; esters such as ethyl acetate and butyl acetate; ketones such as acetone, ethyl ethyl ketone, and methyl isobutyl ketone; ethers such as cellosolve, butyl carbitol, 2-methoxyethanol, 2-ethoxyethanol, 2-ethoxypropanol, 2-(ethoxyethoxy)ethanol, 1,4-dioxane, and tetrahydrofuran; and commercially available various thinners. These solvents can be used alone or in combination.

The weather-resistant composition of the present invention may further contain at least one of additives such as photostabilizers, antistatic agents, antifogging agents, mildewproofing agents, anti-fungus agents, flame retardants, fillers, pigments, dyes, and rust preventives.

The weather-resistant composition of the present invention can be prepared by mixing a bisbenzotriazolylphenol compound (1), a (meth)acrylate compound as the coating film-forming component, a curing agent and, if necessary, one or more various additives described above using a conventional method.

The weather-resistant composition of the present invention can be formed into various known forms of coating materials such as thermosetting coating material, ultraviolet-curing coating material, electron-curing coating material, lacquer coating material, powder coating material and baking coating composition by appropriately selecting types and amounts of the bisbenzotriazolylphenol compound (1), (meth)acrylate compound and curing agent as well as types and amounts of the additives to be optionally incorporated.

When using the weather-resistant composition of the present invention as a lacquer coating material, for example, it can be used as a topcoating material and an intercoating material in a finish coating of automobiles. The weather-resistant composition of the present invention can be used as a base coating material for finish coating. In that case, a coating film with good finish can be obtained.

In the weather-resistant composition of the present invention, the amount of the bisbenzotriazolylphenol compound (1) is not specifically limited and may be appropriately selected from a wide range in light of various conditions such as types and molar light absorption coefficient of the bisbenzotriazolylphenol compound (1), purposes and objects (properties and shapes of substrate) of the resulting compositions, and various properties required to the coating material (film thickness, hardness, mechanical strength, metal ion resistance, weather resistance, and transparency), but is usually within a range from about 0.01 to 50% by weight, preferably from about 0.1 to 35% by weight, and more preferably from about 0.5 to 10% by weight, based on the total solid content of the weather-resistant composition.

The amount of the (meth)acrylate monomer and (meth)acrylate oligomer is appropriately selected according to types and amounts of the functional groups contained therein as well as types and amounts of the curing agent, and is not specifically limited.

The amount of the curing agent is appropriately selected according to types thereof. For example, the thermopolymerizaton initiator or photopolymerizaton initiator is used in the amount within a range from about 0.01 to 5.0% by weight, and preferably from about 0.1 to 3.0% by weight, based on the total solid content of the weather-resistant composition of the present invention. When the amount is less than 0.01% by weight, the degree of curing is insufficient. On the other hand, when the amount exceeds 5% by weight, a large amount of the polymerization initiator is remained, which is uneconomical. The melamine curing agent is used in the amount within a range from about 10 to 50% by weight, and preferably from about 15 to 40% by weight, based on the total solid content of the weather-resistant composition of the present invention. When the amount is less than 10% by weight, the degree of curing is insufficient. On the other hand, when the amount exceeds 50% by weight, the properties of the acrylic resin are impaired, which is not preferable.

When the amount of the bisbenzotriazolylphenol compound (1) is less than the above range, the effect of weather resistance owning to incorporation of the compound (1) may not be applied to the coating film. On the other hand, when the amount drastically exceeds the above range, the hardness and close adhesion to the substrate of the coating film are lowered. Alternatively, coloration is caused sometimes by light absorption of the bisbenzotriazolylphenol compound (1) and the transparency of the coating film is likely to be impaired.

A preferred embodiment of the weather-resistant composition of the present invention is a weather-resistant composition comprising 0.1–35% by weight (more preferably 0.5–10% by weight) of a bisbenzotriazolylphenol compound (1), 1–40% by weight (more preferably 2–35% by weight) of a hdyroxyl group-containing (meth)acrylate compound and 1–40% by weight (more preferably 2–35% by weight) of a crosslinking agent capable of reacting with a hydroxyl group, balance being a cycloalkyl group-containing (meth) acrylate compound, said weather-resistant composition further comprising a (meth)acrylate compound other than the above (meth)acrylate compound and a polymerizable double bond-containing monomer, if necessary.

A known method can be used to form a coating film by coating a substrate with the weather-resistant composition of the present invention. For example, the weather-resistant composition of this invention may be coated on the surface of the substrate and then cured to form a coating film.

The coating amount of the weather-resistant composition of the present invention is not specifically limited and can be appropriately selected from a wide range according to various conditions, for example, purposes of the resulting coating film, degree of various properties required to the coating film, and materials and shapes of the substrate. However, the amount is set so that the thickness of the film after curing is within a range from about 0.1 to 30 $\mu$m, and preferably from about 1 to 20 $\mu$m, in order to provide the coating film with sufficient mechanical strength while maintaining good various properties, prevent crack from occurring in the coating film, and further enhance the close adhesion between the coating film and substrate.

In case a synthetic resin having high transparency such as polyester is coated with the weather-resistant composition of the present invention, the coating film can be provided with excellent weather resistance without impairing the transparency of the resin by coating it in a film thickness within a range from about 0.1 to 1 $\mu$m.

Known methods can be employed as the coating method and examples thereof include roll coating method, gravure coating method, flow coating method, dip coating method, spin coating method, spray coating method, and screen printing method.

According to forms of the weather-resistant composition of the present invention, the curing method can be appropriately selected from known methods. In case the weather-resistant composition of the present invention is a lacquer coating material, it is preferably cured at normal temperature or under heating. In case of the curing type coating material, it is preferably cured by heating or irradiating with visible ray, or energy radiation such as electron beam or ultraviolet light.

Curing is conducted by heating at a temperature within a range from about 50 to 150° C., and preferably from about 80 to 130° C., using a conventional method.

In case the weather-resistant composition of the present invention contains a solvent when it is cured by irradiation with visible ray or energy radiation, the solvent may be evaporated before irradiation. In this evaporation, known drying methods such as hot-air drying, infrared heating and far infrared heating can be appropriately employed.

The coating film thus obtained retain excellent metal ion resistance, weather resistance and transparency for a prolonged period and has high hardness, and is also superior in mechanical strength, wear resistance, scratch resistance, close adhesion with a substrate, and chemical resistance.

The substrate can be appropriately selected according to the form of the weather-resistant composition of the present invention and examples thereof include molded articles having an arbitrary shape, which are made from one or more materials such as metal, synthetic resin, ceramic, wood, and paper.

When using the weather-resistant composition of the present invention in the curing type coating material, it is preferably applied to the substrate including wood and synthetic resin. When using in the lacquer coating material, it is preferably applied to the substrate including wood and metal.

Examples of the metal include, but are not limited to, simple substances such as iron, copper, nickel, chromium, zinc, lead, tin, titanium, and aluminum, and alloys containing at least one of them. Examples of more specific molded article of metal are plates, bars, pillars, pipes, tanks, needle-like articles, frames and window frames of buildings and structures, body of transports such as railway rolling stock, aircraft, marine structure and automobile, lamps, indicators, household appliances, general business machines, furnitures, and toys.

Examples of the synthetic resin include, but are not limited to, thermoplastic resins such as polymethyl methacrylate resin, polycarbonate resin, polyallyl diglycidyl carbonate resin, ABS resin, polystyrene resin, polyester resin, acetate resin, polyvinyl chloride resin, acrylic resin, and polyolefin resin; and thermosetting resins such as epoxy resin, unsaturated polyester resin, phenol resin, polyurethane, amino resin, and polyimide resin.

More specifically, molded articles of the synthesis resin are used for various purposes, for example, vehicles such as glass substitutes (e.g. front glass, rear window, opera window, delta window, sunroof, etc.) of transports such as automobile, railway rolling stock, aircraft and marine structure and automobile interior and exterior parts such as lamps (e.g. head lamp, tail lamp, direction indicator, etc.), various meters and dial plates, bumpers and wheel caps; parts of household appliances such as refrigerator, cleaner, television set and air conditioner; general business machines such as computer, printer, copying machine, facsimile, optical disc, telephone and wireless installation; sundries such as toy, furniture, wrapping, sport goods and game machine parts; civil engineerings such as lighting plate, window glass, window frame, wall material, thermal insulating material, floor covering material, roofing material, soundproofing material and wall covering paper; optical instruments such as spectacles, contact lens and camera; medical appliances; general industrial materials; and atomic purposes.

EXAMPLES

The following Synthesis Examples, Examples and Comparative Examples further illustrate the present invention in detail.

Examples 1 to 28, Comparative Examples 1 to 6 and Experiments 1 to 2 relate to weather-resistant compositions of the present invention in the form of a curing type coating material, while Examples 29 to 31, Comparative Examples 7 to 13 and Experiments 3 to 7 relate to weather-resistant compositions of the present invention in the form of a lacquer coating material.

In the followings, "parts" and "percentages" are by "weight" and "weight %" respectively unless otherwise stated.

Synthesis Example 1

In a glass flask equipped with a cooling tube, a nitrogen introducing tube, a thermometer and a stirrer, 129.3 g of 2,2'-methylenebis[6-(2H-1,2,3-benzotrizol-2-yl)-4-(2-hydroxyethyl)phenol] (manufactured by Otsuka Chemical Co., Ltd. under the trade name of RUVA-10), 113.5 g of ε-caprolactone (manufactured by DAICEL CHEMICAL INDUSTRIES, LTD.) and 50 ppm of a mono-n-butyltin fatty acid salt (manufactured by Sankyo Organic Chemicals Co., Ltd. under the trade name of SCAT-24) were charged and reacted at 150° C. for six hours to prepare 2,2'-methylenebis[6-(2H-1,2,3-benzotriazol-2-yl)-4-(16-hydroxy-4,1-dioxo-3,10-dioxahexadecyl)phenol] (yield: 98%).

The compound thus prepared was a viscous oil having an acid value (mgKOH/g) of 1.8, a viscosity of 2765 cp (60° C.), a number-average molecular weight (Mn) of 1072, a weight-average molecular weight (Mw) of 1248 and Mw/Mn of 1.213.

Synthesis Example 2

In the same manner as in Synthesis Example 1, except that the amount of ε-caprolactone was changed to 170.3 g, 2,2'-methylenebis[6-(2H-1,2,3-benzotriazol-2-yl)-4-(23-hydroxy-4,11,18-trioxo-3,10,17-trioxatricosyl)phenol] was prepared (yield: 98%).

The compound thus prepared was a viscous oil having an acid value (mgKOH/g) of 1.8, a viscosity of 2645 cp (60° C.), a number-average molecular weight (Mn) of 1391, a weight-average molecular weight (Mw) of 1688 and Mw/Mn of 1.213.

Synthesis Example 3

In the same manner as in Synthesis Example 1, except that the amount of RUVA was changed to 93.7 g and the amount of ε-caprolactone was changed to 247.2 g, 2,2'-methylenebis[6-(2H-1,2,3-benzotriazol-2-yl)-4-(31-hydroxy-4,11,18,25-tetraoxo-3,10,17,24-tetraoxahexadecyl)phenol] was prepared (yield: 98%).

The compound thus prepared was an oily substance having an acid value (mgKOH/g) of 2.5, a viscosity of 1287 cp (60° C.), a number-average molecular weight (Mn) of 1697, a weight-average molecular weight (Mw) of 2775 and Mw/Mn of 1.222.

Synthesis Example 4

In the same manner as in Synthesis Example 3, except that the amount of ε-caprolactone was changed to 206.3 g, 2,2'-methylenebis[6-(2H-1,2,3-benzotriazol-2-yl)-4-(37-hydroxy-4,11,18,25,32-pentaoxo-3,10,17,24,31-pentaoxaheptatriacontyl)phenol] was prepared (yield: 98%).

The compound thus prepared was an oily substance having an acid value (mgKOH/g) of 2.5, a viscosity of 987 cp (60° C.), a number-average molecular weight (Mn) of 2017, a weight-average molecular weight (Mw) of 2465 and Mw/Mn of 1.222.

The (meth)acrylate oligomer (OL), (meth)acrylate monomer (MO), ultraviolet absorber (RUVA, UVA), polymerization initiator (IN) and solvent (SO) used in the following Examples and Comparative Examples are shown below, together with abbreviations of the respective compounds.

[(Meth)acrylate Oligomer]

(OL-1): polyester acrylate-based oligomer (manufactured by TOAGOSEI Co., Ltd. under the trade name of ARONIC M-8030, viscosity: 500 to 1100 cps/25° C.)

(OL-2): polyester acrylate-based oligomer (manufactured by OSAKA ORGANIC CHEMICAL IND. under the trade name of BISCOAT 3700, viscosity: 400 to 600 cps/25° C.)

(OL-3): polyurethane acrylate-based oligomer (manufactured by TOAGOSEI Co., Ltd. under the trade name of ARONIC M-1200, viscosity: 20,000 to 300,000 cps/25° C.)

(OL-4): polyurethane acrylate-based oligomer (manufactured by Negami Chemical Industrial Co., Ltd. under the trade name of ARTRESIN UN-3320, viscosity: 40,000 cps/25° C.)

(OL-5): polyepoxy acrylate-based oligomer (manufactured by SHOWA HIGHPOLYMER Co., LTD. under the trade name of RIPOXY SP-1509, viscosity: 10,000 cps/25° C.)

[(Meth)acrylate Monomer]

(MO-1): tetrahydrofurfuryl acrylate
(MO-2): 2-(2-ethoxyetoxy)ethyl acrylate
(MO-3): 1,6-hexadiol acrylate
(MO-4): trimethylolpropane triacrylate
(MO-5): pentaerythritol triacrylate
(MO-6): pentaerythritol trimethacrylate
(MO-7): dipentaerythritol hexacrylate
(MO-8): hexa(2-methacryloyloxyethoxy)cyclotriophan

[Ultraviolet Absorber]

(RUVA-1): 2,2'-methylenebis[6-(2H-1,2,3-benzotriazol-2-yl)-4-(16-hydroxy-4,11-dioxo-3,10-dioxahexadecyl)phenol] prepared in Synthesis Example 1

(RUVA-2): 2,2'-methylenebis[6-(2H-1,2,3-benzotriazol-2-yl)-4-(23-hydroxy-4,11,18-trioxo-3,10,17-trioxatricosyl)phenol] prepared in Synthesis Example 2

(RUVA-3): 2,2'-methylenebis[6-(2H-1,2,3-benzotriazol-2-yl)-4-(31-hydroxy-4,11,18,25-tetraoxo-3,10,17,24-tetraoxahexadecyl)phenol] prepared in Synthesis Example 3

(RUVA-4): 2,2'-methylenebis[6-(2H-1,2,3-benzotriazol-2-yl)-4-(37-hydroxy-4,11,18,25,32-pentaoxo-3,10,17,24,31-pentaoxaheptatriacontyl)phenol] prepared in Synthesis Example 4

(UVA-1): 2-(2'-hydroxy-5'-methylphenyl)-2H-benzotriazole (manufactured by Ciba Geigy Co. under the trade name of TINUVIN-P)

(UVA-2): 2-(2'-hydroxy-3'-tert-butyl-5'-methylphenyl)-5-chloro-2H-benzotriazole (manufactured by Ciba Geigy Co. under the trade name of TINUVIN-326)

(UVA-3): 2-(2'-hydroxy-5'-tert-octylphenyl)-2H-benzotriazole (manufactured by Ciba Geigy Co. under the trade name of TINUVIN-329)

(UVA-4): 2-hydroxy-4-methoxybenzophenone (manufactured by Sumitomo Chemical Co., Ltd. under the trade name of SUMISORB 110)

(UVA-5): 2-hydroxy-4-octyloxybenzophenone (manufactured by Sumitomo Chemical Co., Ltd. under the trade name of SUMISORB 130)

(UVA-6): 2-[2-hydroxy-3,5-di(1,1-dimethylbenzyl)phenyl]-2H-benzotriazole (manufactured by Ciba Geigy Co. under the trade name of TINUVIN-900)

(UVA-7):2-(3,5-di-t-butyl-2-hydroxyphenyl)-2H-benzotriazole (manufactured by Ciba Geigy Co. under the trade name of TINUVIN-320)

[Polymerization Initiator]

(1N-1): manufactured by Ciba Geigy Co. under the trade name of Darocur 1173 (chemical name: 2-hydroxy-2-methyl-1-phenyl-propan-1-one)
(1N-2): manufactured by Ciba Geigy Co. under the trade name of Irgacure 184 (chemical name: 1-hydroxy-cyclohexyl-phenyl-ketone)
(1N-3): manufactured by Ciba Geigy Co. under the trade name of Irgacure 907 (chemical name: 2-methyl-1[4-(methylthio)phenyl]-2-morpholinopropan-1-one)
(1N-4): 2,2-azobisisobutyronitrile (manufactured by Otsuka Chemical Co., Ltd.)
(1N-5): benzoyl peroxide

[Solvent]

(SO-1) toluene
(SO-2) ethyl acetate
(SO-3) methyl ethyl ketone

Examples 1 to 28 and Comparative Examples 1 to 6

The (meth)acrylate oligomer, (meth)acrylate monomer, ultraviolet absorber, polymerization initiator and solvent were mixed in each amount shown in the following Tables 1 to 5 to prepare a weather-resistant composition of the present invention in the form of a curing type coating material.

TABLE 1

|  |  | Example No. |  |  |  |  |  |  |  |
|---|---|---|---|---|---|---|---|---|---|
|  |  | 1 | 2 | 3 | 4 | 5 | 6 | 7 | 8 |
| Oligomer | OL-1 | 40 | 40 | 40 | 40 | — | — | — | — |
|  | OL-2 | — | — | — | — | 30 | 30 | 30 | 30 |
| Monomer | MO-1 | 20 | 20 | 20 | 20 | — | — | — | — |
|  | MO-2 | — | — | — | — | 10 | 10 | 10 | 10 |
|  | MO-4 | 40 | 40 | 40 | 40 | — | — | — | — |
|  | MO-5 | — | — | — | — | 60 | 60 | 60 | 60 |
| Ultraviolet absorber | RUVA-1 | 3 | — | — | — | 3 | — | — | — |
|  | RUVA-2 | — | 3 | — | — | — | 3 | — | — |
|  | RUVA-3 | — | — | 3 | — | — | — | 3 | — |
|  | RUVA-4 | — | — | — | 3 | — | — | — | 3 |
| Polymerization initiator | IN-1 | 3 | 3 | 3 | 3 | — | — | — | — |
|  | IN-2 | — | — | — | — | 4 | 4 | 4 | 4 |

TABLE 2

|  |  | Example No. |  |  |  |  |  |  |  |
|---|---|---|---|---|---|---|---|---|---|
|  |  | 9 | 10 | 11 | 12 | 13 | 14 | 15 | 16 |
| Oligomer | OL-3 | 45 | 45 | 45 | 45 | — | — | — | — |
|  | OL-4 | — | — | — | — | 30 | 30 | 30 | 30 |
| Monomer | MO-1 | — | — | — | — | 10 | 10 | 10 | 10 |
|  | MO-3 | 10 | 10 | 10 | 10 | — | — | — | — |
|  | MO-5 | — | — | — | — | 30 | 30 | 30 | 30 |
|  | MO-7 | 45 | 45 | 45 | 45 | 30 | 30 | 30 | 30 |
| Ultraviolet absorber | RUVA-1 | 3 | — | — | — | 3 | — | — | — |
|  | RUVA-2 | — | 3 | — | — | — | 3 | — | — |
|  | RUVA-3 | — | — | 3 | — | — | — | 3 | — |
|  | RUVA-4 | — | — | — | 3 | — | — | — | 3 |
| Polymerization initiator | IN-1 | — | — | — | — | 3 | 3 | 3 | 3 |
|  | IN-3 | 2 | 2 | 2 | 2 | — | — | — | — |

TABLE 2-continued

|  |  | Example No. |  |  |  |  |  |  |  |
|---|---|---|---|---|---|---|---|---|---|
|  |  | 9 | 10 | 11 | 12 | 13 | 14 | 15 | 16 |
| Solvent | SO-1 | 30 | 30 | 30 | 30 | — | — | — | — |
|  | SO-3 | — | — | — | — | 10 | 10 | 10 | 10 |

TABLE 3

|  |  | Example No. |  |  |  |  |  |  |  |  |
|---|---|---|---|---|---|---|---|---|---|---|
|  |  | 17 | 18 | 19 | 20 | 21 | 22 | 23 | 24 | 25 |
| Oligomer | OL-4 | — | — | — | — | 30 | 30 | 30 | 30 | 30 |
|  | OL-5 | 30 | 30 | 30 | 30 | — | — | — | — | — |
| Monomer | MO-1 | — | — | — | — | 10 | 10 | 10 | 10 | 10 |
|  | MO-5 | — | — | — | — | 30 | 30 | 30 | 30 | 30 |
|  | MO-6 | 20 | 20 | 20 | 20 | — | — | — | — | — |
|  | MO-7 | 5 | — | — | — | 30 | 30 | 30 | 30 | 30 |
|  | MO-8 | 50 | 50 | 50 | 50 | — | — | — | — | — |
| Ultraviolet absorber | RUVA-1 | 5 | — | — | — | 5 | 25 | 50 | 5 | 5 |
|  | RUVA-2 | — | 5 | — | — | — | — | — | — | — |
|  | RUVA-3 | — | — | 5 | — | — | — | — | — | — |
|  | RUVA-4 | — | — | — | 5 | — | — | — | — | — |
| Polymerization initiator | IN-1 | 3 | 3 | 3 | 3 | 3 | 3 | 3 | 3 | 3 |
|  | IN-4 | — | — | — | — | — | — | — | — | — |
|  | IN-5 | — | — | — | — | — | — | — | — | — |
| Solvent | SO-2 | 20 | 20 | 20 | 20 | — | — | — | — | — |
|  | SO-3 | — | — | — | — | 10 | 10 | 10 | 10 | 10 |

TABLE 4

|  |  | Example No. |  |  |
|---|---|---|---|---|
|  |  | 26 | 27 | 28 |
| Oligomer | OL-4 | 30 | 30 | 30 |
| Monomer | MO-1 | 10 | 10 | 10 |
|  | MO-5 | 30 | 30 | 30 |
|  | MO-7 | 30 | 30 | 30 |
| Ultraviolet absorber | RUVA-1 | 5 | 5 | 5 |
|  | RUVA-2 | — | — | — |
|  | RUVA-3 | — | — | — |
|  | RUVA-4 | — | — | — |
| Polymerization initiator | IN-1 | 3 | — | — |
|  | IN-4 | — | 3 | — |
|  | IN-5 | — | — | 3 |
| Solvent | SO-3 | 10 | 10 | 10 |

TABLE 5

|  |  | Comp. Example No. |  |  |  |  |  |
|---|---|---|---|---|---|---|---|
|  |  | 1 | 2 | 3 | 4 | 5 | 6 |
| Oligomer | OL-4 | 30 | 30 | 30 | 30 | 30 | 30 |
| Monomer | MO-1 | 10 | 10 | 10 | 10 | 10 | 10 |
|  | MO-5 | 30 | 30 | 30 | 30 | 30 | 30 |
|  | MO-7 | 30 | 30 | 30 | 30 | 30 | 30 |
| Ultraviolet absorber | UVA-1 | — | 3 | — | — | — | — |
|  | UVA-2 | — | — | 3 | — | — | — |
|  | UVA-3 | — | — | — | 3 | — | — |
|  | UVA-4 | — | — | — | — | 3 | — |
|  | UVA-5 | — | — | — | — | — | 3 |
| Polymerization initiator | IN-1 | 3 | 3 | 3 | 3 | 3 | 3 |
| Solvent | SO-3 | 10 | 10 | 10 | 10 | 10 | 10 |

Experiment 1

A polycarbonate plate having a thickness of 3 mm was coated with each of the curing type coating materials prepared in Examples 1 to 28 and Comparative Examples 1 to 6 in a film thickness of 5 μm using a bar coater, and then irradiated with light at a line speed of 2 m/min. using a high-pressure mercury lamp (80 W/cm) in the air to obtain a cured coating film.

In Examples 24, 25 and 26, an ABS resin plate having a thickness of 3 mm, a polyolefin resin plate having a thickness of 3 mm and an acrylic resin plate having a thickness of 3 mm were respectively used in place of the polycarbonate plate. In Examples 27 and 28, the substrate was coated with the coating material in the same manner as in Example 1, and then the coating material was cured by heating in a hot-air circulation dryer at 100° C. for 30 minutes. In the Examples using the solvent, the coated plate was dried in a hot-air circulation dryer at 70° C. for 15 minutes before curing.

The appearance, pencil hardness, scratch resistance, close adhesion and weather resistance of the cured coating film thus formed were evaluated by the following procedures.

(1) Appearance: It was visually judged. The criteria for evaluation are as follows.
   ○: any crack or crazing is not observed in coating film, good appearance
   Δ: some crack or crazing is observed in coating film, slightly poor appearance
   X: coating film was naturally peeled off completely, poor appearance (2) Pencil hardness: The pencil hardness of the coating film was measured in accordance with the method defined in JIS K-5400.

(3) Scratch resistance test: The scratch degree of the coating film was judged by using a steel wool #0000 according to the following criteria.
   A: No scratch is formed or slight scratch is formed when rubbed strongly
   B: some scratch is formed when rubbed strongly
   C: severe scratch was formed (4) Close adhesion test: A coating film was provided with 100 checkers (1 mm×1 mm) and, after closely adhering a Cellophane tape, the Cellophane tape was rapidly peeled off in a vertical direction. It was confirmed whether the coating film was peeled off or not, and then the close adhesion of the coating film was evaluated by the following criteria.
   ○: peel was not observed
   X: peel was partially observed (5) Weather resistance: The weather resistance was carried out by using a sunshine carbon weatherometer (manufactured by Suga Test Instruments Co., Ltd., Model WEL-SUN DCH, rainfall for 18 min. per cycle for 120 min.) as an accelerated exposure testing machine. 1000 hours and 3000 hours after the beginning of the test, the appearance of the coating film was visually judged. The criteria for evaluation are as follows.
   ○: appearance of coating film was not changed as compared with appearance before exposure
   Δ: crack or crazing was observed in coating film as compared with appearance before exposure
   X: coating film was naturally peeled off completely as compared with appearance before exposure The yellowness (ΔYI) of the coating film was measured in accordance with the measuring method defined in JIS K7103. The yellowing is caused by deterioration due to ultraviolet light or discoloration of the ultraviolet absorber due to an influence of metal ions, and is an index of the weather resistance.

The limitation of the yellowness (ΔYI) where the presence or absence of yellowing can be visually judged when samples are placed on a white paper is generally about 5. In the present invention, when the sample shows the yellowness of 4 or less after a lapsed time of 1000 hours and shows the yellowness of 10 or less after a lapsed time of 3000 hours, it is rated that the sample has practically sufficient weather resistance.

The results are shown in Tables 6 and 7 below.

TABLE 6

| | | | | | Yellowness (ΔYI) | |
|---|---|---|---|---|---|---|
| | Appearance | Pencil hardness | Scratch resistance | Close adhesion | 1000 hours | 3000 hours |
| Examples | | | | | | |
| 1 | ○ | 2H | A | ○ | 4 ○ | 9 ○ |
| 2 | ○ | 2H | A | ○ | 4 ○ | 9 ○ |
| 3 | ○ | 3H | A | ○ | 4 ○ | 9 ○ |
| 4 | ○ | 3H | A | ○ | 3 ○ | 8 ○ |
| 5 | ○ | 3H | A | ○ | 4 ○ | 10 ○ |
| 6 | ○ | 3H | A | ○ | 4 ○ | 9 ○ |
| 7 | ○ | 3H | A | ○ | 4 ○ | 10 ○ |
| 8 | ○ | 3H | A | ○ | 3 ○ | 9 ○ |
| 9 | ○ | 3H | A | ○ | 3 ○ | 8 ○ |
| 10 | ○ | 3H | A | ○ | 3 ○ | 8 ○ |
| 11 | ○ | 3H | A | ○ | 3 ○ | 8 ○ |
| 12 | ○ | 3H | A | ○ | 2 ○ | 6 ○ |
| 13 | ○ | 4H | A | ○ | 2 ○ | 5 ○ |
| 14 | ○ | 4H | A | ○ | 2 ○ | 5 ○ |
| 15 | ○ | 4H | A | ○ | 2 ○ | 5 ○ |
| 16 | ○ | 4H | A | ○ | 2 ○ | 4 ○ |

TABLE 7

| | | | | | Yellowness (ΔYI) | |
|---|---|---|---|---|---|---|
| | Appearance | Pencil hardness | Scratch resistance | Close adhesion | 1000 hours | 3000 hours |
| Examples | | | | | | |
| 17 | ○ | 4H | A | ○ | 3 ○ | 7 ○ |
| 18 | ○ | 4H | A | ○ | 3 ○ | 7 ○ |
| 19 | ○ | 4H | A | ○ | 3 ○ | 6 ○ |
| 20 | ○ | 4H | A | ○ | 2 ○ | 6 ○ |
| 21 | ○ | 4H | A | ○ | 2 ○ | 5 ○ |
| 22 | ○ | 4H | A | ○ | 2 ○ | 4 ○ |
| 23 | ○ | 4H | A | ○ | 1 ○ | 3 ○ |
| 24 | ○ | 3H | A | ○ | 3 ○ | 7 ○ |
| 25 | ○ | 5H | A | ○ | 2 ○ | 4 ○ |
| 26 | ○ | 4H | A | ○ | 2 ○ | 4 ○ |
| 27 | ○ | 4H | A | ○ | 3 ○ | 5 ○ |
| 28 | ○ | 4H | A | ○ | 3 ○ | 6 ○ |
| Comp. Examples | | | | | | |
| 1 | ○ | 2H | A | ○ | 11 [*1] | 25 [*2] |
| 2 | ○ | 2H | A | ○ | 9 Δ | 20 x |
| 3 | ○ | 3H | A | ○ | 7 Δ | 15 Δ |
| 4 | ○ | 3H | A | ○ | 6 Δ | 13 Δ |
| 5 | ○ | 2H | A | ○ | 9 Δ | 20 x |
| 6 | ○ | 2H | A | ○ | 8 Δ | 20 x |

[*1] fine crazing occurred
[*2] transparency was impaired because of turbidity of coating film As is apparent from Tables 6 and 7, any of the coating films formed from the weather-resistant composition containing a bisbenzotriazolylphenol compound (1) as the ultraviolet absorber has the appearance, pencil hardness, scratch resistance and close adhesion, which are equal to those of the coating films formed from the weather-resistant composition containing no ultraviolet absorber of Comparative Example 1 and the weather-resistant compositions containing a conventional ultraviolet absorber of Comparative Examples 2 to 6, and also superior in weather resistance to these Comparative Examples.

Examples 29 to 30

The respective components were mixed in each amount (parts) shown in Table 8 below and the mixture was added dropwise in 50 parts of toluene maintained at 80° C. under stirring over two hours to prepare lacquer coating materials containing about 50% of a copolymer as an nonvolatile component, respectively.

TABLE 8

| | Example No. | |
|---|---|---|
| | 29 | 30 |
| RUVA-2 | 0.5 | 1.5 |
| Methyl methacrylate | 25.5 | 25.5 |
| Butyl acrylate | 13.8 | 12.8 |
| Vinyl acetate | 10.0 | 10.0 |
| Methacrylic acid | 0.2 | 0.2 |
| Azobisisobutyronitrile | 0.2 | 0.2 |

Comparative Example 7

In the same manner as in Example 29, except that RUVA-2 was not used, a lacquer coating material containing about 47% of a nonvolatile component was prepared.

Comparative Examples 8 to 11

In the copolymer solution obtained in Comparative Example 7, an ultraviolet absorber was added in the amount (parts) shown in Table 9 below to prepare lacquer coating materials, respectively.

TABLE 9

| | | Comp. Example No. | | | |
|---|---|---|---|---|---|
| | | 8 | 9 | 10 | 11 |
| Ultraviolet absorber | UVA-1 | 0.5 | 1.5 | — | — |
| | UVA-6 | — | — | 0.5 | 1.5 |

Comparative Example 12

In the same manner as in Example 29, except that 4-methacryloyl-2,2,6,6-tetramethylpiperidine as a polymerizable ultraviolet-stable compound described in Japanese Patent Laid-Open Gazette No. 3–124776 was used in place of RUVA-2, a lacquer coating material containing about 50% of a nonvolatile component was prepared.

Example 31 and Comparative Example 13

(i) The respective components were mixed in each amount (parts) shown in Table 10 below and the mixture was added dropwise in 100 parts of xylene maintained at 80° C. under stirring over two hours to prepare lacquer coating materials containing about 50% of a copolymer as an nonvolatile component, respectively.

TABLE 10

| | | Example 31a | Comp. Example 13a |
|---|---|---|---|
| Lacquer coating material | RUVA-2 | 3 | — |
| | Styrene | 12 | 15 |
| | Methyl methacylate | 15 | 15 |
| | Butyl methacylate | 40 | 40 |
| | 2-ethylhexyl acrylate | 13 | 13 |
| | Hydroxyethyl meth-acylate | 15 | 15 |
| | Acrylic acid | 2 | 2 |
| | Azobisisobutyronitrile | 0.2 | 0.2 |
| Intercoating material | Aforementioned lacquer coating materials | 80 | 80 |
| | 50% melamine-formamide resin solution | 20 | 20 |
| | Organic sulfur pigment | 0.01 | 0.01 |
| | Aluminum paste | 6 | 6 |
| | 10% toluene solution of UVA-7 | — | 13 |

Using 80 parts of this lacquer coating material, the respective components were mixed in each amount (parts) shown in Table 10 and the viscosity was controlled by further adding a mixed solvent of 60 parts of toluene, 30 parts of butyl acetate and 10 parts of n-butanol to prepare intercoating materials (Example 31a and Comparative Example 13a). As the 50% melamine-formamide resin solution, the solution manufactured by Mitsui Toatsu Chemicals, Inc. was used. As the organic sulfur pigment, the pigment manufactured by Ciba Geigy Co. was used.

(ii) The respective components were mixed in each amount (parts) shown in Table 11 below and the mixture was added dropwise in 100 parts of xylene maintained at 80° C. under stirring over two hours to prepare lacquer coating materials containing about 50% of a copolymer as an nonvolatile component, respectively.

TABLE 11

| | | Example 31b | Comp. Example 13b |
|---|---|---|---|
| Lacquer coating material | RUVA-2 | 3 | — |
| | Styrene | 27 | 30 |
| | Butyl methacylate | 30 | 30 |
| | 2-ethylhexyl acrylate | 25 | 25 |
| | Hydroxyethyl meth-acylate | 15 | 15 |
| | Acrylic acid | 2 | 2 |
| | Azobisisobutyronitrile | 0.2 | 0.2 |
| Topcoating material | Aforementioned lacquer coating materials | 70 | 70 |
| | 50% melamine-formamide resin solution | 30 | 30 |
| | 10% toluene solution of UVA-7 | — | 11 |

Using 70 parts of this lacquer coating material, the respective components were mixed in each amount (parts) shown in Table 12 and the viscosity was controlled by further adding a mixed solvent of 85 parts of toluene and 15 parts of n-butanol to prepare topcoating materials (Example 31b and Comparative Example 13b). As the 50% melamine-formamide resin solution, aforementioned solution manufactured by Mitsui Toatsu Chemicals, Inc. was used.

Using the intercoating material and topcoating material obtained above, a coated steel plate was produced. A steel plate subjected to degreasing and phosphating treatments was coated with an automobile electrodeposition primer and an intercoating surfacer and then the top surface was spray-coated with an intercoating material. After leaving at room temperature for 10 minutes, the surface was spray-coated with a topcoating material and the coating film was cured by heating in a hot-air circulation apparatus at 140° C. for 30 minutes to produce coated steel plates, respectively.

Experiment 2

A quartz substrate having a thickness of 1 mm was coated with the curing type coating material of Example 29 in a film thickness of 1 $\mu$m using a spinner, dried in a hot-air circulation dryer at 70° C. for 15 minutes, and then irradiated with light in an air at a line speed of 2 m/min. using a high-pressure mercury lamp (80 W/cm) to obtain a cured coating film.

The resulting sample was dipped in an aqueous of 95% methanol solution at 60° C. and the absorbency (wavelength: 340 nm) of an ultraviolet absorption spectrum was measured every 2 hours, and then dissolution of the ultraviolet absorber was evaluated. The absorbency retention (%) at each measuring time was calculated based on the absorbency (100) of the sample before test.

Using the curing type coating materials of Examples 30 and 31 as well as Comparative Examples 6, 7 and 8, samples were made an tested (measurement of absorbency) in the same manner as in case of the curing type coating material of Example 29. With respect to these cured coating films, the absorbency at a wavelength of 330 nm was measured by an ultraviolet absorption spectrum.

The measurement results are shown in FIG. 1

As is apparent from FIG. 1, the ultraviolet absorbability of the cured coating films made from the curing type coating materials (Examples 29, 30 and 31) of the present invention is completely retained after 20 hours, whereas, the ultraviolet absorbability of the cured coating films made from the curing type coating materials containing an ultraviolet absorber (UVA) having no polymerizable group of Comparative Examples 6, 7 and 8 is lowered with a lapse of time.

Experiment 3

Commercially available polycarbonate pellets containing no ultraviolet absorber (manufactured by MITSUBISHI GAS CHEMICAL COMPANY, INC.) were injection-molded to obtain a plate-like molded article having a thickness of 3 mm.

The surface of the plate-like molded article was spray-coated with the lacquer coating materials obtained in Examples 29 to 30 and Comparative Examples 7 to 8 and 12, and then dried at room temperature for a week to form a cured coating film having a thickness of 30 $\mu$m.

After measuring the gloss (60 degree specular reflectance) of the surface of these cured coating films, the plate-like molded articles, on which the coating film was formed, were used as specimens and subjected to the exposure test using a duke cycle sunshine weatherometer (manufactured by Suga Testing Machine Co., Ltd., Model WEL-SUN DC, black panel temperature: 80° C., rainfall for 18 min. every 120 min.). Then, the color difference ($\Delta$Eab) after exposure for 500 hours and the gloss of the surface of the coating film after exposure for 500 hours and 1000 hours were measured and, furthermore, the gloss retention (%) based on the gloss (100) before exposure was determined.

These results are shown in Table 12.

TABLE 12

|  | Example 29 | Example 30 | Comp. Example 7 | Comp. Example 8 | Comp. Example 12 |
|---|---|---|---|---|---|
| Initial gloss | 95 | 94 | 95 | 95 | 92 |
| Gloss retention (%) | | | | | |
| 500 hours | 100 | 100 | 90 | 88 | 100 |
| 1000 hours | 100 | 98 | 73 | 82 | 98 |
| Color difference ($\Delta$Eab) | 0.7 | 0.7 | 18 | 1.2 | 16 |

As is apparent from Table 12, the coating films formed from the lacquer coating materials prepared in Examples are superior in both the durability and the prevention of discoloration of the polycarbonate plate.

Experiment 4

A polybutylene terephthalate (PBT) having a thickness of 3 mm, which was whitened with a pigment, spray-coated with each of the lacquer coating materials of Examples 29 to 30 and Comparative Examples 8 to 11, and then dried at 40° C. for two days to form a cured coating film (specimen) having a thickness of 0.1 mm. This specimen was dipped in hot water at 40° C., which contains copper powder in a proportion of 4 g/liter, for 10 days and the state of discoloration before and after test was evaluated by yellowing color difference ($\Delta$YI). The results are shown in Table 13.

TABLE 13

|  | Example 29 | Example 30 | Comp. Example 8 |
|---|---|---|---|
| Yellowness ($\Delta$YI) | 2.8 | 3.1 | 69.2 |

|  | Comp. Example 9 | Comp. Example 10 | Comp. Example 11 |
|---|---|---|---|
| Yellowness ($\Delta$YI) | 102 | 7.1 | 10.6 |

As is apparent from Table 13, any of the coating films formed from the lacquer coating materials of Examples 29 and 30 exhibited small yellowness as compared with the coating films formed from the lacquer coating materials of Comparative Examples 8 to 11. The coating films were visually observed before and after test. As a result, any of the coating films formed from the lacquer coating materials of Examples 29 and 30 was transparent before and after test, whereas, the color of the coating films formed from the lacquer coating materials of Comparative Examples 8 to 11 changed into dark brown from light yellow due to the chelete reaction, resulting in opaque.

As is apparent from this fact, the coating films formed from the lacquer coating materials of Examples 29 and 30 have good metal ion resistance.

Experiment 5

The lacquer coating materials obtained in Example 29 as well as Comparative Examples 9 and 11 were diluted with tetrachloroethane and each of the resulting solution was dropped on a quartz glass disc having a diameter of 30 mm and a thickness of 1 mm to form a uniform cured coating film having a thickness of about 1 mm using a sipper. This disc was dipped in hot water at 70° C. and the absorbency at 340 nm of the coating film was measured every two hours.

Then, the absorbency retention [%, (absorbency after 10 hours/initial absorbency)×100] after a lapse time of 10 hours, based on the absorbency (100) of the specimen before dipping, was determined.

Experiment 6

Discs made by using the lacquer coating materials obtained in Examples 29 and Comparative Examples 9 and 11 in the same operation as in Experiment 5 were dipped in an aqueous 1% sodium hydroxide solution maintained at 70° C. and the absorbency at 340 nm of the coating films formed on these discs was measured every two hours. Then, the absorbency retention after 10 hours have passed since the completion of dipping was determined.

The results of Experiments 5 and 6 are shown in Table 14.

TABLE 14

|  | Example 29 | Comp. Example 9 | Comp. Example 11 |
|---|---|---|---|
| Absorbency retention (%) |  |  |  |
| Dipping in hot water | 99 | 10 | 72 |
| Dipping in aqueous NaOH solution | 98 | 0 | 16 |

As is apparent from Table 14, regarding the coating films formed from the lacquer coating materials containing a conventional ultraviolet absorber of Comparative Examples 9 and 11, the absorbency was lowered due to dissolution of the ultraviolet absorber and dissolution of the coating films is observed. The absorbency is drastically lowered when dipped in an aqueous sodium hydroxide solution. As is apparent from this fact, the coating films formed from the coating materials of Comparative Examples 9 and 11 is inferior in chemical resistance.

On the other hand, the coating film formed from the lacquer coating material of Example 29 does not cause dissolution of the ultraviolet absorber even when dipped in any of hot water and an aqueous sodium hydroxide solution, and the absorbency of the coating film is retained in the same degree as that of an initial absorbency. Accordingly, it is found that the coating film formed from the lacquer coating material of Example 29 has excellent chemical resistance.

Experiment 7

The coated steel plates made in Example 31 and Comparative Example 13 were subjected to the same accelerated exposure test (for 1000 hours) as in Experiments 1 and 3. During the test, the surface of the coated steel plates was rubbed 50 times every 50 hours using a towel impregnated with an automobile wax (manufactured by SURLUSTER Co. under the trade name of BLUE WAX) containing a natural carnauba wax as a main component but without abrasive. Then, after a lapsed time of 1000 hours, the color difference (ΔEab) and gloss retention (%) of the surface were evaluated.

The results are shown in Table 15.

TABLE 15

|  | Example 31 | Comp. Example 13 |
|---|---|---|
| Initial gloss | 97 | 98 |
| Gloss retention (%) 1000 hours | 94 | 79 |
| Color difference (ΔEab) | 0.4 | 0.7 |

The state of the coating film was observed after test. As a result, a difference was not observed in crack, close adhesion and storage stability of the coating film between Example 31 and Comparative Example 13.

However, as is apparent from Table 15, Comparative Example 13 containing a conventional ultraviolet absorber exhibited low gloss retention and dissolution of the ultraviolet absorber was observed in the wax. On the other hand, the gloss was retained almost completely in Example 31 and any dissolution of the ultraviolet absorber in the wax was not observed. Therefore, the wax resistance is excellent.

Comparative Examples 14 and 15

In accordance with the formulation shown in Table 16 below, compositions free from the polymerization initiator of Comparative Examples 14 and 15 were prepared.

The compositions of Comparative Examples 14 and 15 were evaluated in the same procedure as in Experiment 1.

The results are shown in Table 16 below. As a result, the compositions of Comparative Examples 14 and 15 could not exhibit sufficient hardness as compared with the compositions of Examples and the scratch resistance was also poor. After the completion of the weather resistance test for 3000 hours, the film became turbid.

TABLE 16

|  |  | Comp. Example No. | |
|---|---|---|---|
|  |  | 14 | 15 |
| Oligomer | OL-1 | 40 | — |
|  | OL-2 | — | 30 |
| Monomer | MO-1 | 20 | — |
|  | MO-2 | — | 10 |
|  | MO-3 | — | — |
|  | MO-4 | 40 | — |
|  | MO-5 | — | 60 |
| Ultraviolet absorber | RUVA-1 | 3 | 3 |
|  | RUVA-2 | — | — |
|  | RUVA-3 | — | — |
|  | RUVA-4 | — | — |
| Polymerization initiator | IN-1 | — | — |
|  | IN-2 | — | — |

TABLE 17

| Comp. Examples | Appearance | Pencil hardness | Scratch resistance |
|---|---|---|---|
| 14 | ○ | 2B | C |
| 15 | ○ | 3B | C |

| Comp. Examples | Close adhesion | Yellowness (ΔYI) | |
|---|---|---|---|
|  |  | 1000 hours | 3000 hours |
| 14 | ○ | 6 | 9*2 |
| 15 | ○ | 5 | 9*2 |

INDUSTRIAL APPLICABILITY

The composition of the present invention can form a coating film which is not impaired in mechanical strength, exhibits excellent weather resistance, metal ion resistance and transparency for a prolonged period, and is less likely to cause surface cracks.

What is claimed is:

1. A weather-resistant composition comprising:
(I) a bisbenzotriazolylphenol compound as an ultraviolet absorber, which is represented by the general formula (1):

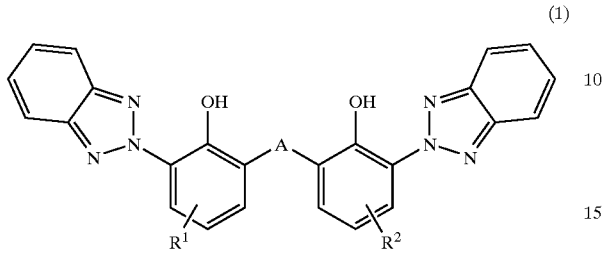

wherein A is directly bonded, or represents a methylene group which may have a substituent, a straight-chain or branched alkylene group having 2 to 6 carbon atoms, a group of —O—, or a group of —NH—, and $R^1$ and $R^2$ are the same or different and represent a group (B):

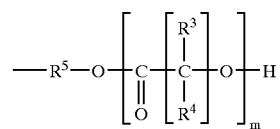

in which $R^5$ is directly bonded, or represents a straight-chain or branched alkylene group having 1 to 12 carbon atoms, $R^3$ and $R^4$ are the same or different and represent a hydrogen atom or an alkyl group having 1 to 10 carbon atoms, m represents an integer of 1 to 20, and n represents an integer of 4 to 8;

(II) at least one (meth)acrylate compound as a coating film-forming component, which is selected from (meth)acrylate monomer and (meth)acrylate oligomer; and (III) a curing agent.

2. A weather-resistant composition according to claim 1, which contains, as the curing agent, one or more curing agents selected from the group consisting of curing catalyst, thermopolymerization initiator, polymerization accelerator, photopolymerization initiator, photopolymerization auxiliary, crosslinking agent and melamine curing agent.

3. A weather-resistant composition according to claim 2, wherein the curing agent is a photopolymerization initiator, a thermopolymerization initiator or a melamine curing agent.

4. A coating material comprising the weather-resistant composition of claim 1.

5. A molded article, partial or whole surface of which is coated with the coating material of claim 4.

* * * * *